United States Patent
Kanai et al.

(10) Patent No.: US 10,205,554 B2
(45) Date of Patent: Feb. 12, 2019

(54) MULTIPLEX COMMUNICATION SYSTEM AND WORK MACHINE

(71) Applicant: FUJI CORPORATION, Chiryu-shi (JP)

(72) Inventors: Hidekazu Kanai, Chiryu (JP); Nobuo Nagasaka, Okazaki (JP); Shigemoto Hirota, Nagoya (JP)

(73) Assignee: FUJI CORPORATION, Chiryu-shi (JP)

( * ) Notice: Subject to any disclaimer, the term of this patent is extended or adjusted under 35 U.S.C. 154(b) by 0 days.

(21) Appl. No.: 15/532,691

(22) PCT Filed: Dec. 3, 2014

(86) PCT No.: PCT/JP2014/081943
§ 371 (c)(1),
(2) Date: Jun. 2, 2017

(87) PCT Pub. No.: WO2016/088214
PCT Pub. Date: Jun. 9, 2016

(65) Prior Publication Data
US 2017/0346595 A1    Nov. 30, 2017

(51) Int. Cl.
*H04J 14/08* (2006.01)
*H04J 3/08* (2006.01)

(52) U.S. Cl.
CPC ............... *H04J 14/08* (2013.01); *H04J 3/08* (2013.01)

(58) Field of Classification Search
CPC .... H04J 14/0282; H04J 14/0286; H04J 14/08; H04J 3/08
See application file for complete search history.

(56) References Cited

U.S. PATENT DOCUMENTS

| | | | |
|---|---|---|---|
| 5,943,315 A | 8/1999 | Iwasawa et al. | |
| 2002/0093709 A1* | 7/2002 | Kim | H04B 10/272 398/79 |

(Continued)

FOREIGN PATENT DOCUMENTS

| | | |
|---|---|---|
| CN | 103329475 A | 9/2013 |
| EP | 1 760 895 A1 | 3/2007 |

(Continued)

OTHER PUBLICATIONS

International Search Report dated Mar. 10, 2015 in PCT/JP2014/081943 filed Dec. 3, 2014.

(Continued)

*Primary Examiner* — Casey Kretzer
(74) *Attorney, Agent, or Firm* — Oblon, McClelland, Maier & Neustadt, L.L.P.

(57) ABSTRACT

In an electronic component mounting device, a first multiplexing device of a head section which is attachable to and detachable from a Y-axis slider is connected to a second multiplexing device through an electric communication cable. The first multiplexing device, from which the cable is likely to be removed, is connected through the electric communication cable for which the communication failure due to dust or the like is relatively unlikely to occur. Second and third multiplexing devices, from which cables are less likely to be removed, are connected through the optical communication cable. The second multiplexing device separates data directed to the input and output device, among frame data received from the third multiplexing device, multiplexes only data directed to the first multiplexing device from the second multiplexing device, and transfers the multiplexed data to the first multiplexing device by the electric communication cable.

5 Claims, 5 Drawing Sheets

(56) References Cited

U.S. PATENT DOCUMENTS

| | | | |
|---|---|---|---|
| 2005/0025437 A1 | 2/2005 | Kano et al. | |
| 2006/0039357 A1* | 2/2006 | Kim | H04J 14/0226 370/352 |
| 2006/0083245 A1* | 4/2006 | Tanaka | H04L 12/12 370/395.2 |
| 2009/0080881 A1 | 3/2009 | Yokoyama | |
| 2011/0211584 A1* | 9/2011 | Mahmoud | H04L 12/2834 370/401 |
| 2012/0087662 A1* | 4/2012 | Suzuki | H04J 3/1694 398/66 |
| 2013/0266306 A1* | 10/2013 | Kozaki | H04J 3/0655 398/5 |

FOREIGN PATENT DOCUMENTS

| | | |
|---|---|---|
| EP | 2 882 113 A1 | 6/2015 |
| JP | 61-107827 A | 5/1986 |
| JP | 10-13445 A | 1/1998 |
| JP | 11-215029 A | 8/1999 |
| JP | 2003-283117 A | 10/2003 |
| JP | 2005-10309 A | 1/2005 |
| WO | 2006/106973 A1 | 10/2006 |
| WO | WO 2014/020658 A1 | 2/2014 |

OTHER PUBLICATIONS

Office Action dated Jun. 1, 2018 in Chinese Patent Application No. 201480083795.5 submitting English translation only, 6 pages.
Extended European Search Report dated Jun. 19, 2018 in European Patent Application No. 14907238.1, 10 pages.

* cited by examiner

MULTIPLEX COMMUNICATION SYSTEM AND WORK MACHINE

TECHNICAL FIELD

The present application relates to a multiplex communication system, and a work machine that transmits data concerning mounting work by the multiplex communication system.

BACKGROUND ART

In the related art, some multiplexing devices (such as time division multiplexing devices) that collect and communicate the input and output signals of multiple devices may use optical fiber cables in order to increase the data transfer rate. For example, a technique for constructing a network in which multiple input and output devices (a master device, a slave device, or the like) are connected to each other by an optical fiber cable is disclosed (for example, PTL 1, or the like). In a communication system disclosed in PTL 1, data is transmitted by multiplex communication, and in a case where a communication abnormality occurs in the network due to a cause such as disconnection of the optical fiber cable, information relating to the occurred abnormality is transmitted, and a recovery process is performed.

CITATION LIST

Patent Literature

PTL 1: JP-A-10-13445

SUMMARY

However, in a device to which the optical fiber cable described above is connected, for example, an optical transceiver module, communication failure may occur because minute dust adheres to the distal end of the connector or cable. Therefore, when removing the optical fiber cable from the connector of the optical transceiver module, a process of attaching a cap for preventing dust adhesion to the distal end of the cable is required. In addition, when dust adheres to the connector, a work such as cleaning a connecting portion is required.

The present disclosure has been made in view of the above problems, and an object of the present disclosure is to provide a multiplex communication system and a work machine, in which opportunities to attach and detach an optical communication cable can be reduced, thereby suppressing occurrence of communication failure due to dust or the like.

A multiplex communication system according to a technique disclosed in the present application made in view of the above problems, includes a master device; a first slave device which is connected to the master device through an optical communication cable, and performs multiplex communication by optical communication; and a second slave device which is connected to the first slave device through an electric communication cable, the electric communication cable being configured to be attachable and detachable, and performs multiplex communication by electric communication, in which the first slave device performs a demultiplexing process of separating data directed to the first slave device, among multiplexed data received from the master device, by multiplex communication by the optical communication, and a transfer process of multiplexing data directed to the second slave device from the master device, among data demultiplexed according to the demultiplexing process, and transferring the multiplexed data to the second slave device by multiplex communication by the electric communication. In addition, the master device referred to here is, for example, a device which mainly controls transmission and reception of data in multiplex communication. The slave device is a device that executes transmission and reception of data based on control of the master device. In a control network (field network) for connecting an industrial work machine such as EtherCAT (registered trademark), a device that controls the network is the master device and a device that is dependent on the control of the master device is the slave device.

Further, the disclosure according to the present application is not limited to the disclosure of the multiplex communication system, but can also be implemented as a disclosure of a work machine that transmits data concerning a mounting work by the multiplex communication system.

According to the technique disclosed in the present application, it is possible to provide a multiplex communication system and a work machine, in which opportunities to attach and detach an optical communication cable can be reduced, thereby suppressing occurrence of communication failure due to dust or the like.

DESCRIPTION OF EMBODIMENTS

Hereinafter, embodiments of the present disclosure will be described with reference to the drawings. First, an electronic component mounting device (hereinafter sometimes abbreviated as "mounting device") will be described as an example of a device to which a multiplex communication system of the present application is applied.

(Configuration of Mounting Device 10)

Figure 1:
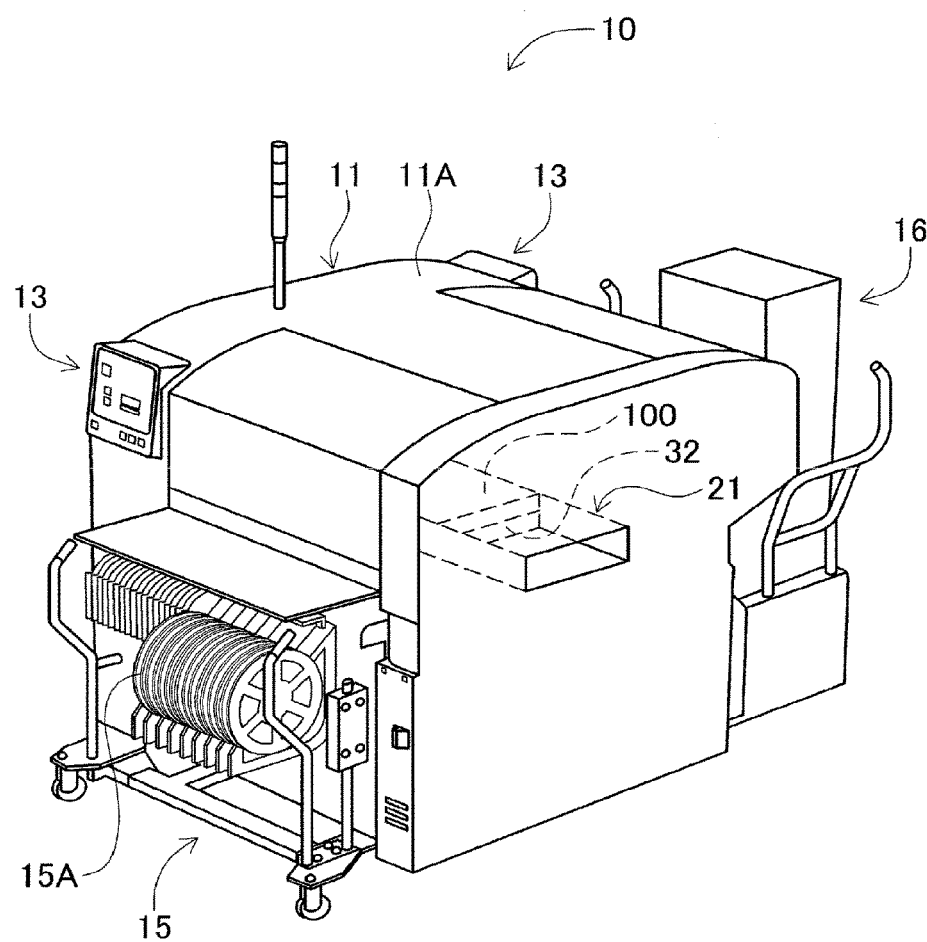
FIG. 1 is a perspective view of an electronic component mounting device to which the multiplex communication system of this embodiment is applied.
Figure 1:
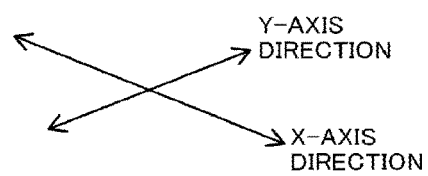

As illustrated in FIG. 1, a mounting device 10 includes a device main body 11, a pair of display device 13 integrally provided in the device main body 11, and supply devices 15 and 16 detachably provided for the device main body 11. The mounting device 10 of the present embodiment is a device that performs a mounting work of electronic components (not shown) on a circuit board 100 which is conveyed by a conveyance device 21 accommodated in the device main body 11, based on the control of the controller 86 shown in FIG. 3. Further, in the present embodiment, as shown in FIG. 1 and FIG. 2, a description will be made, with a direction (a left-right direction in FIG. 2) along which the circuit board 100 is conveyed by the conveyance device 21 referred to as an X-axis direction, and a direction which is perpendicular to the X-axis direction horizontal to the conveyance direction of the circuit board 100 referred to as a Y-axis direction.

The device main body 11 includes display devices 13 at both ends in the Y-axis direction on one end side in the X-axis direction. Each display device 13 is a touch panel type display device and displays information on the mounting work of the electronic component. In addition, the supply devices 15 and 16 are mounted on the device main body 11 so as to be sandwiched from both sides in the Y-axis direction. The supply device 15 is a feeder type supply device, and includes multiple tape feeders 15A accommodated in a state in which various electronic components are taped and wound around a reel. The supply device 16 is a tray type supply device, and includes multiple component trays 16A (see FIG. 2) on which multiple electronic components are placed.

Figure 2:
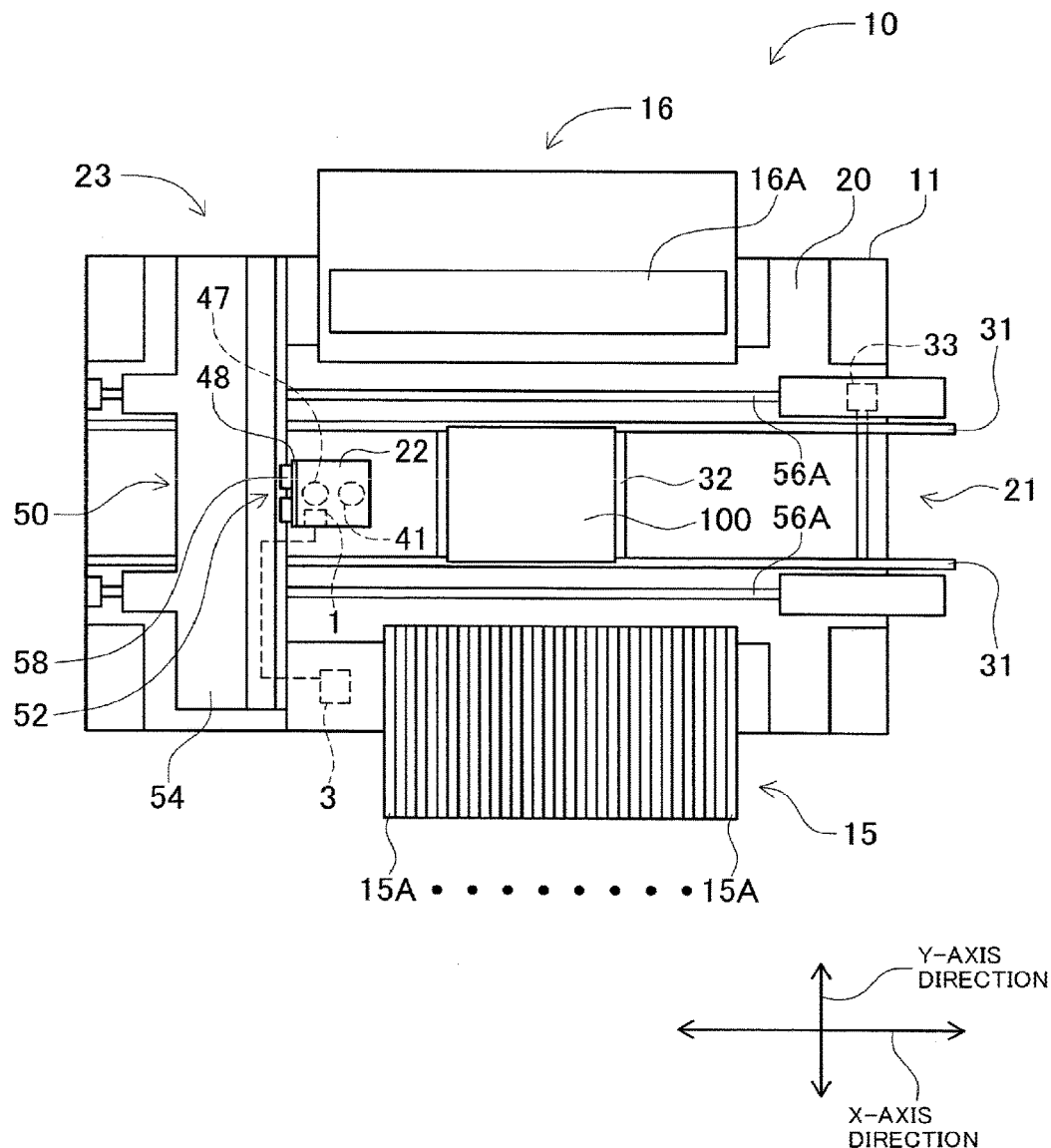
FIG. 2 is a schematic plan view of the electronic component mounting device shown in FIG. 1 with the upper cover thereof removed.

FIG. 2 is a schematic plan view showing the mounting device 10 from the view point of the upper side (the upper side in FIG. 1) with the upper cover 11A (see FIG. 1) of the device main body 11 removed. As shown in FIG. 2, the device main body 11 includes the conveyance device 21 described above, a head section 22 that mounts electronic components on the circuit board 100, and a moving device 23 that moves the head section 22, on a base 20.

The conveyance device 21 is provided substantially in the center of the Y-axis direction in the base 20, and includes a pair of guide rails 31, a board holding device 32 held by the guide rail 31, and an electromagnetic motor 33 that moves the board holding device 32. The board holding device 32 holds the circuit board 100. The electromagnetic motor 33 is drivingly connected to a conveyor belt of which output shaft is stretched to the side of the guide rail 31. The electromagnetic motor 33 is, for example, a servomotor that can accurately control the rotation angle. The conveyance device 21 moves the circuit board 100 in the X-axis direction together with the board holding device 32 as the conveyor belt circulates based on the driving of the electromagnetic motor 33.

The head section 22 includes a suction nozzle 41 that sucks the electronic component on the lower face facing the circuit board 100. The suction nozzle 41 communicates with the negative pressure air passage and the positive pressure air passage through an electromagnetic valve of a positive and negative pressure supply device (not shown), sucks and holds the electronic component by negative pressure, and separates the held electronic component by supplying a slight positive pressure. The head section 22 incorporates multiple electromagnetic motors 43 (see FIG. 3) as a driving source for causing the suction nozzle 41 to move up and down and the suction nozzle 41 to rotate about its axis, and changes the position of the electronic component to be held in the up-down direction and the holding posture of the electronic component. The suction nozzle 41 is provided with multiple nozzles that suck electronic components, and the head section 22 incorporates an electromagnetic motor 43 for individually rotating each nozzle. Further, the head section 22 includes a slave 45 (see FIG. 3) connected to a control network to be described later. The slave 45 includes elements such as various sensors connected thereto and processes signals input to and output from the elements. Further, the head section 22 is provided with a parts camera 47 that images an electronic component sucked and held by the suction nozzle 41 from the supply position of each of the supply devices 15 and 16. Image data imaged by the parts camera 47 is processed by the controller 86 (see FIG. 3), and the holding position error or the like of the electronic component at the suction nozzle 41 is acquired. Further, the suction nozzle 41 is attachable and to and detachable from the head section 22 and can be changed depending on the size, the shape, or the like of the electronic component.

Further, the head section 22 moves to a certain position on the base 20 by the moving device 23. Specifically, the moving device 23 includes an X-axis direction slide mechanism 50 that moves the head section 22 in the X-axis direction, and a Y-axis direction slide mechanism that moves the head section 22 in the Y-axis direction 52. The X-axis direction slide mechanism 50 includes an X-axis slider 54 provided on the base 20 movably in the X-axis direction, and a linear motor 56 (see FIG. 3) as a driving source. The X-axis slider 54 moves to a certain position in the X-axis direction based on the driving of the linear motor 56. In the linear motor 56, for example, permanent magnets of which north poles and south poles are alternately disposed are provided on the inner wall of a guide rail 56A disposed on the base 20 as a fixing section side, and an excitation coil is provided in the X-axis slider 54 as the movable section side. The X-axis slider 54 moves by the action of a magnetic field generated by electric power supplied to the excitation coil and a magnetic field generated by the permanent magnet of the guide rail 56A on the fixing section side.

Further, the Y-axis direction slide mechanism 52 includes a Y-axis slider 58 provided on the side face of the X-axis slider 54 movably in the Y-axis direction, a linear motor 60 (see FIG. 3) as a driving source. The Y-axis slider 58 moves to a certain position in the Y-axis direction based on the driving of the linear motor 60. Further, the Y-axis slider 58 is fixed with a mark camera 49 (see FIG. 3) that captures an image of the circuit board 100 facing downward. Thus, the mark camera 49 becomes possible to image the surface at a certain position of the circuit board 100, by moving the Y-axis slider 58. Image data imaged by the mark camera 49 is processed by the controller 86 (see FIG. 3), and information on the circuit board 100, a holding position error, or the like are acquired. The head section 22 is attached to the Y-axis slider 58, and moves to a certain position on the base 20 as the moving device 23 is driven. Further, the head section 22 is attached to the Y-axis slider 58 through the connector 48 and is attachable and detachable with one touch, and can be changed to a different type of head section, for example, a dispenser head or the like.

Figure 3:
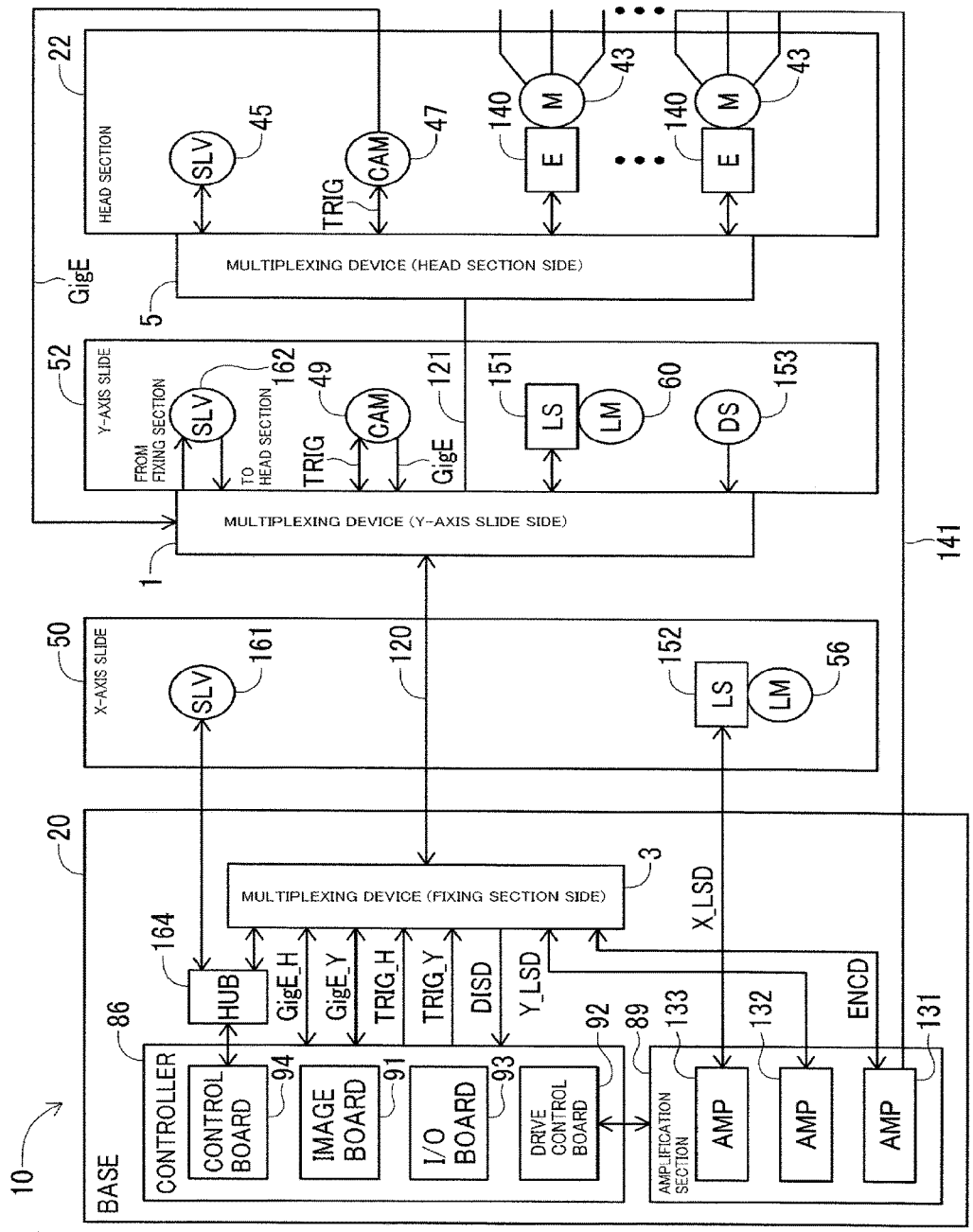
FIG. 3 is a block diagram illustrating a multiplex communication system included in the electronic component mounting device.

FIG. 3 is a block diagram showing the configuration of the multiplex communication system applied to the mounting device 10. As shown in FIG. 3, in the mounting device 10, data transmission between the controller 86 and an amplification section 89 which are incorporated in the base 20 and respective devices included in the Y-axis direction slide mechanism 52 and the head section 22 is performed by the multiplex communication system. The configuration of the multiplex communication system shown in FIG. 3 is an example and is changed appropriately.

In the mounting device 10, the multiplexing device 1 provided in the Y-axis direction slide mechanism 52 is connected to the multiplexing device 3 provided in the base 20 through the optical communication cable 120. The optical communication cable 120 is, for example, an optical fiber cable. As shown in FIG. 2, the multiplexing device 1 is provided on the lower face of the Y-axis slider 58 and is connected to the multiplexing device 3 incorporated in the base 20 through the optical fiber cable. The multiplexing device 3 includes an optical module 220 (see FIG. 4) connected to an optical module 230 (see FIG. 4) of the multiplexing device 1 through the optical communication cable 120, and transmits and receives frame data FRMD1

(see FIG. 4) obtained by multiplexing various types of data through the optical communication cable 120 with Time Division Multiplexing (TDM). Communication in the optical communication cable 120 is, for example, full-duplex communication of 5 Gbps.

The controller 86 is mainly configured with a computer including a CPU, a RAM, and the like, and includes an image board 91, a drive control board 92, an I/O board 93, and a control board 94. The image board 91 is a board that controls transmission and reception of data (image data and the like) of the mark camera 49 of the Y-axis slider 58 and the parts camera 47 of the head section 22. The mark camera 49 outputs image data imaged through the GigE cable GigE to the multiplexing device 1 according to an image transmission standard such as, for example, GigE-vision (registered trademark). The mark camera 49 performs imaging in response to receiving a trigger signal TRIG indicating the start of imaging, transmitted from the controller 86 (I/O board 93), and outputs the image data imaged through the GigE cable GigE to the multiplexing device 1. The image board 91 receives the image data transferred from the mark camera 49 to the multiplexing device 3 through the optical communication cable 120 ("GigE_Y (Y-axis slide side)" in the drawing).

Further, in the mounting device 10, the multiplexing device 1 provided in the Y-axis direction slide mechanism 52 is connected to the multiplexing device 5 provided in the head section 22 through the electric communication cable 121. The electric communication cable 121 is, for example, a LAN cable conforming to the communication standard of Gigabit Ethernet (registered trademark) or a USB cable conforming to the communication standard of a Universal Serial Bus (USB) 3.0. The parts camera 47 of the head section 22 outputs the image data imaged in response to the trigger signal TRIG from the controller 86 (I/O board 93) to the multiplexing device 1 through a GigE cable. The image board 91 receives the image data transferred from the parts camera 47 to the multiplexing device 3 ("GigE_H (head section side)" in the drawing). The controller 86 processes the image data of the parts camera 47 and the mark camera 49, received by the image board 91.

The drive control board 92 controls the amplification section 89 so as to control the electromagnetic motor 43 of the head section 22, the linear motor 56 of the X-axis direction slide mechanism 50, and the linear motor 60 of the Y-axis direction slide mechanism 52. The amplification section 89 includes amplifiers 131, 132, and 133 corresponding to the head section 22, the X-axis direction slide mechanism 50, and the Y-axis direction slide mechanism 52. The amplifier 131 corresponds to the head section 22 and transmits an encoder signal such as checking of the activation state to the encoders 140 of the multiple electromagnetic motors 43 provided in the head section 22 through the communication cables 120 and 121. In addition, the amplifier 131 receives encoder signals such as torque information and positional information (serial communication conforming to RS-422 and RS-485) from the encoder 140 through the communication cables 120 and 121, and transfers the encoder signals to the drive control board 92. The drive control board 92 performs feedback control of the amplifier 131 so as to drive each electromagnetic motor 43 based on the input encoder signal. The electromagnetic motor 43 is, for example, a servomotor that includes coils of respective phases: U phase, V phase, and W phase and is driven by a three-phase alternating current having coils for each phase of for example, and the coils of respective phases are connected to the amplifier 131 through a power supply line 141. The electromagnetic motor 43 is driven by the three-phase alternating current supplied from the amplifier 131 through the power supply line 141. For example, the drive control board 92 changes the duty ratio of the power supply voltage supplied to the electromagnetic motor 43 by the amplifier 131, by feedback control such as PID control according to the received encoder signal ("encoder signal ENCD" in FIG. 3) to raise or lower the position of the suction nozzle 41 (see FIG. 2).

The Y-axis direction slide mechanism 52 is provided with a linear scale 151 that detects the position of the Y-axis slider 58 moving on the guide rail along the Y-axis direction. The linear scale 151 transmits a linear scale signal ("linear scale signal Y_LSD" in FIG. 3) such as the position in the Y-axis direction (Y coordinate value) of the Y-axis slider 58 through the optical communication cable 120 to the amplifier 132. The amplifier 132 controls the linear motor 60 based on the linear scale signal received from the linear scale 151.

Similarly, the X-axis direction slide mechanism 50 is provided with a linear scale 152 that detects the position of the X-axis slider 54 moving on the guide rail along the X-axis direction. The linear scale 152 is connected to the amplifier 133 corresponding to the linear scale 152 without passing through the communication cables 120 and 121, and outputs a linear scale signal ("linear scale signal X_LSD" in FIG. 3) of the position (X coordinate value) in the X-axis direction of the X-axis slider 54 to the amplifier 133. The amplifier 133 controls the linear motor 56 based on the linear scale signal received from the linear scale 152.

The I/O board 93 is a board for processing control signals of the parts camera 47 and the mark camera 49 and detection signals of various sensors and the like. For example, the controller 86 controls the I/O board 93 to transmit a trigger signal TRIG to the parts camera 47. In addition, the Y-axis direction slide mechanism 52 is provided with a circuit board height sensor 153 that measures the height position of the upper face of the circuit board 100 conveyed by the conveyance device 21 (see FIG. 2). The circuit board height sensor 153 measures the height position of the upper face of the circuit board 100 with reference to the reference height position of the mounting device 10. The circuit board height sensor 153 transmits the measurement result ("displacement sensor signal DISD" in FIG. 3) to the I/O board 93 by the optical communication cable 120. The controller 86 corrects the position at which the suction nozzle 41 sucking and holding the electronic component is lowered toward the circuit board 100 according to the measurement result of the circuit board height sensor 153 received by the I/O board 93.

The control board 94 is a board that controls the signals of the slave 45 of the head section 22, and the slaves 161 and 162 to which the various elements of the X-axis direction slide mechanism 50 and the Y-axis direction slide mechanism 52 are connected, by the control network. The base 20 is provided with a network hub 164 for inputting and outputting signals of the slaves 45, 161, and 162 connected to the control network to and from the control board 94 by aggregating the signals. The control board 94 is connected to the slave 45 of the head section 22 through the communication cables 120 and 121, and the network hub 164. Further, the control board 94 is connected to the slave 162 of the Y-axis direction slide mechanism 52 through the optical communication cable 120 and the network hub 164. Further, the control board 94 is connected to the slave 161 of the X-axis direction slide mechanism 50 through the LAN cable connected to the network hub 164.

The control network referred to here is, for example, MECHATROLINK (registered trademark)-III or EtherCAT (registered trademark), and is intended to reduce the cost for network construction by realizing the integration (reduction) wires by constructing a field network in which the control board 94 is a master, and the control data transmitted and received to and from the elements connected to the slaves 45, 161 and 162. More specifically, for example, EtherCAT (registered trademark) is a network of a mechanism in which an EtherCAT frame transmitted from a master (control board 94) is transmitted so as to circulate each of the slaves 45, 161, and 162, and transmitted and received at a high speed. For example, as shown in FIG. 3, the slave 162 performs a reading or writing process on the EtherCAT frame received from the control board 94 (the fixing section side) and transfers the frame to the head section 22 side. The slave 162 copies data from the read data position for the slave 162 which is preset in the EtherCAT frame and performs processes such as drive of a relay according to the contents of the copied data. Further, the slave 162 writes information indicating the completion of driving of the relay, detection information of the sensor, and the like to the write data position for the slave 162 which is preset in the EtherCAT frame, and transfers the information to the head section 22. In this manner, the slaves 45, 161, and 162 exchanges and transmit frames at high speed while performing an input and output process on EtherCAT frames. The elements connected to the slaves 45, 161, and 162 are relays, switches, indicator lamps, various sensors, and the like.

In the multiplex communication system applied to the mounting device 10 described above, the data items of the respective devices (such as the mark camera 49 and the electromagnetic motor 43) provided in the head section 22 and the Y-axis direction slide mechanism 52 are multiplexed by the multiplexing devices 1 and 5, and transmitted to the multiplexing device 3 through wired communication cables 120 and 121. The multiplexing device 3 cancels the multiplexing of the received optical signal and transfers the individual data to the corresponding board (for example, the image board 91 if it is image data of the mark camera 49). The controller 86 processes the data output from the multiplexing device 3 to each board, and executes the following control on the head section 22 or the like. The mounting device 10 performs a mounting work of the electronic component by the head section 22, on the circuit board 100 held in the conveyance device 21 (see FIG. 2), while transmitting data related to the mounting work between the respective devices by the multiplex communication system.

More specifically, the controller 86 drives and controls the conveyance device 21 to convey the circuit board 100 to the mounting work position, and fixedly holds the circuit board 100 at that position. Next, the controller 86 moves the head section 22 onto the circuit board 100 with the moving device 23, and images the circuit board 100 with the mark camera 49. The controller 86 detects the type of the circuit board 100, and the holding position error of the circuit board 100 by the conveyance device 26 from the image data of the mark camera 49. The controller 86 causes the supply devices 15 and 16 to supply electronic components corresponding to the detected type of the circuit board 100, and moves the head section 22 to the supply position of the electronic component. The head section 22 sucks and holds the electronic component by the suction nozzle 41. Next, the parts camera 47 images the electronic component held in the suction nozzle 41. The controller 86 detects a holding position error of the electronic component from the image data imaged by the parts camera 47. The moving device 23 moves the head section 22 to the mounting position on the circuit board 100. The head section 22 mounts the electronic component on the circuit board 100 by causing the suction nozzle 41 to rotate based on the holding position error of the circuit board 100 and the electronic component.

Figure 4:
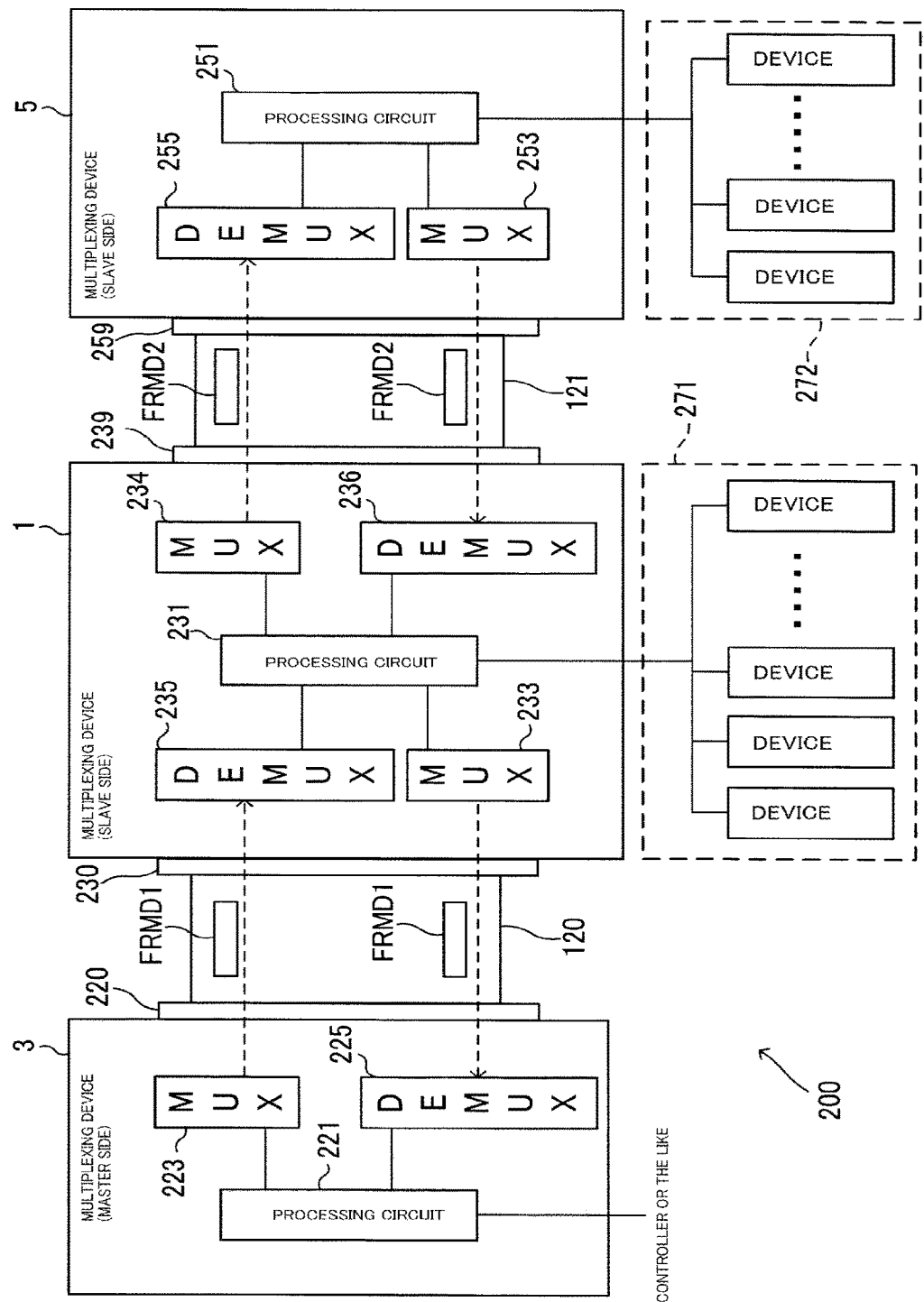
FIG. 4 is a block diagram illustrating the operation of multiplex communication system.

Next, data transmission of the multiplex communication system applied to the electronic component mounting device 10 of the embodiment will be described. FIG. 4 shows the configuration of the multiplex communication system applied to the mounting device 10 by simplifying the configuration to illustrate the operation thereof. In the multiplex communication system 200 shown in FIG. 4, a network connecting multiplexing devices 1, 3, and 5 is constructed. In the multiplex communication system 200, multiplexed data (the frame data FRMD1 and FRMD2) is transmitted between the multiplexing devices 1, 3, and 5.

The multiplexing device 3 includes an optical module 220, a processing circuit 221, a multiplexing section (MUX) 223, and a demultiplexing section (DEMUX) 225. The optical module 220 is connected to the optical module 230 of the multiplexing device 1 through the communication cable 120. The processing circuit 221 performs a process of adding an error correction code to the data input from the controller 86 or the amplification section 89 and then outputting a process result to the multiplexing section 223. The processing circuit 221 is a logic circuit configured with a programmable logic device, for example, a field programmable gate array (FPGA).

The multiplexing section 223 multiplexes the various types of data input from the processing circuit 221 according to, for example, a fixed time (time slots) allocated to the input port. The data multiplexed by the multiplexing section 223 is converted into an optical signal by the optical module 220 and transmitted to the optical communication cable 120 as frame data FRMD1.

The demultiplexing section 225 receives an electric signal obtained by converting the frame data FRMD1 received from the multiplexing device 1 by the optical module 220. The demultiplexing section 225 demultiplexes the input data and outputs the process result data to the processing circuit 221. The processing circuit 221 executes an error detection, a correction process, or the like on the data input from the demultiplexing section 225, and then outputs the process result to the corresponding device (the controller 86 or the like).

The multiplexing device 1 includes an optical module 230, a processing circuit 231, two multiplexing sections (MUX) 233 and 234, two demultiplexing sections (DEMUX) 235 and 236, and an external terminal 239. The multiplexing device 1 converts an optical signal received through the optical communication cable 120 into an electric signal by the optical module 230. The optical modules 220 and 230 are, for example, optical transceivers conforming to the SFP+ standard. The electric signal converted by the optical module 230 is demultiplexed by the demultiplexing section 235. The demultiplexing section 235 outputs the processed data to the processing circuit 231.

The processing circuit 231 is configured with, for example, FPGA, and performs a process of separating the data sent to the multiplexing device 1 and the data sent to the multiplexing device 5, among the demultiplexed data input from the demultiplexing section 235. The processing circuit 231 outputs the data from the multiplexing device 3 to the multiplexing device 5, to the multiplexing section 234. The multiplexing section 234 multiplexes the data input from the processing circuit 231. The data input from the processing circuit 231 is part of the data after the demultiplexing process by the demultiplexing section 235, and includes various data such as data directed to the parts camera 47 of the head section 22 and data directed to the slave 45. The data multiplexed by the multiplexing section 234 is transmitted to the electric communication cable 121 as frame data FRMD2 through the external terminal 239 conforming to, for example, the communication standard of Gigabit Ethernet (registered trademark).

Multiple input and output devices 271 are connected to the multiplexing device 1. The input and output device 271 corresponds to the mark camera 49 and the slave 162 included in the Y-axis direction slide mechanism 52 in the mounting device 10 described above. The processing circuit 231 performs error detection, a correction process, or the like on the data input from the multiplexing device 3 to the input and output device 271 among the data input from the demultiplexing section 235, and outputs a process result to the corresponding input and output device 271. In addition, the processing circuit 231 transmits the data input from the input and output device 271, to the multiplexing device 3 through the multiplexing section 233.

The multiplexing device 5 includes a processing circuit 251, a multiplexing section 253, a demultiplexing section 255, and an external terminal 259. In the multiplexing device 5, the frame data FRMD2 is input to demultiplexing section 255 through external terminal 259 to which the electric communication cable 121 is connected. Multiple input and output devices 272 are connected to the multiplexing device 5. The input and output devices 272 correspond to the parts camera 47, the slave 45, and the like included in the head section 22 in the mounting device 10 described above. The processing circuit 251 executes error detection, a correction process, or the like on the data input from the demultiplexing section 255, and then outputs the process result to the corresponding input and output device 272. In addition, the processing circuit 251 transmits the data input from the input and output device 272 to the multiplexing device 1 through the multiplexing section 253.

Here, in frame data FRMD1, for example, 1 frame is configured with 40 bits. The multiplexing device 3 and the multiplexing device 1 construct, for example, a communication line of 5 Gbps (40 bits×125 MHz), in which the cycle per frame is set to 8 nsec (a frequency is 125 MHz). The communication line is, for example, full-duplex communication. In this case, data is input to the multiplexing device 1 at every clock (frequency of 125 MHz, 8 nsec per clock) transmitting the frame data FRMD1. On the other hand, in the multiplexing device 1 of the present embodiment, when performing a data transfer process from the multiplexing device 3 to the multiplexing device 5, the frequency of the clock which is the reference of the internal process in the FPGA of the processing circuit 231 is adjusted to match the clock that transmits the frame data FRMD1 described above.

The processing circuit 231 receives, for example, data from the demultiplexing section 235 at every predetermined period, and completes a transfer process for the input data until a timing when the data corresponding to the next frame data FRMD1 is input from the demultiplexing section 235. The transfer process referred to here is a process of separating the data input from the demultiplexing section 235 into data directed to the multiplexing device 5 and data directed to the input and output device 271 and transferring the data items to each device. In a case where the timing of receiving the frame data FRMD1 and the timing of performing the transfer process are asynchronous, the multiplexing device 1 needs to include a buffer or the like for adjusting the two timings. On the other hand, according to the configuration of the multiplexing device 1 of the present embodiment, such a timing adjustment buffer is unnecessary, and delay due to the buffer does not occur.

In the transfer process, the multiplexing device 1 executes a process of extracting data directed to the input and output device 271 among the data multiplexed into the frame data FRMD1, and transferring only necessary data to the multiplexing device 5. Therefore, it is possible to make the data transfer rate of the communication (communication by the electric communication cable 121) connecting the multiplexing device 1 and the subsequent multiplexing device 5 slower than the data transfer rate of the communication (communication by the optical communication cable 120) transmitting the frame data FRMD1. In the frame data FRMD2, for example, 1 frame is configured with 8 bits. The multiplexing devices 1 and 5 construct a communication line of 1 Gbps (8 bits×125 MHz), in which the cycle per frame is set to 8 nsec (a frequency is 125 MHz).

Figure 5:
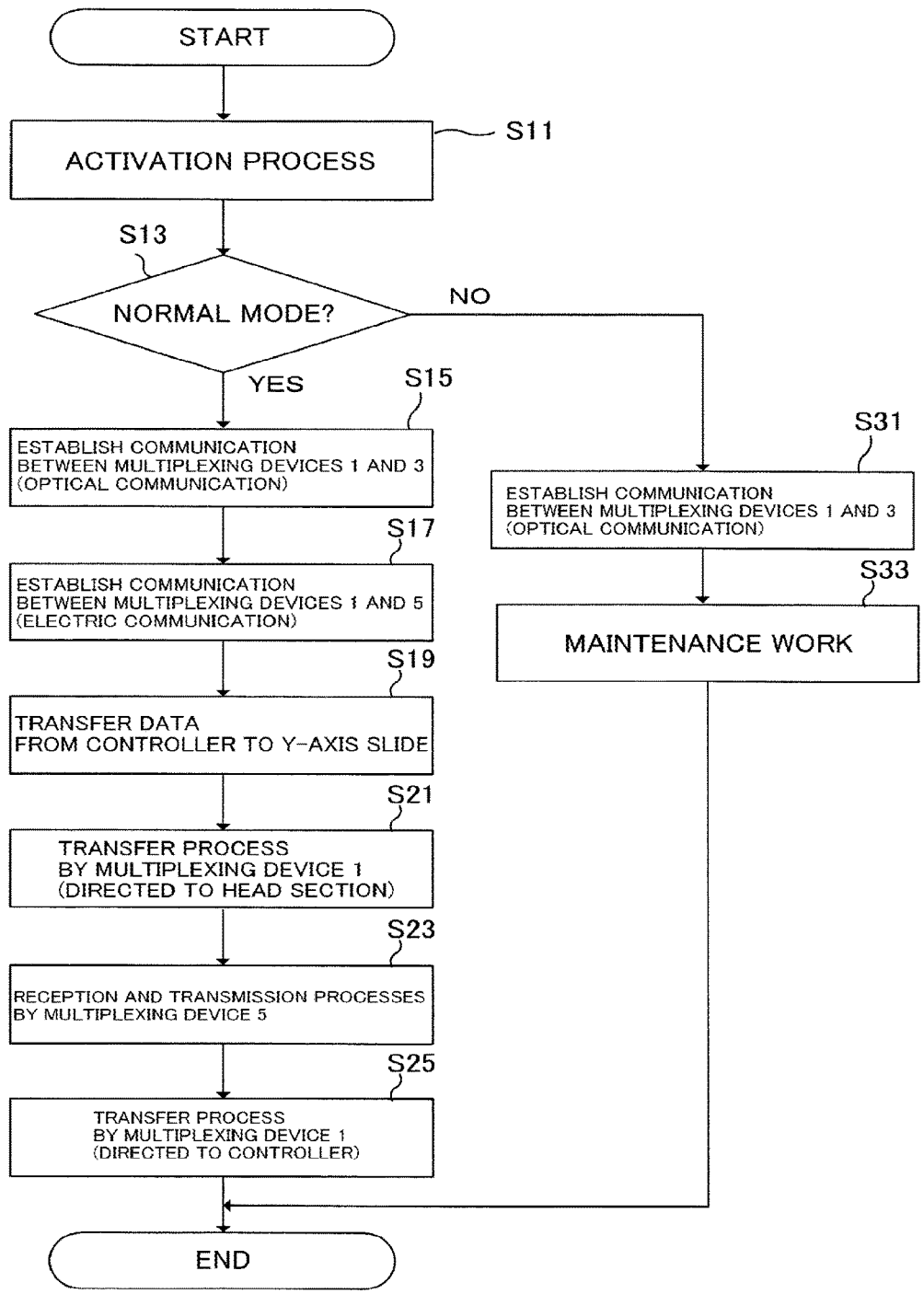
FIG. 5 is a flowchart illustrating processing contents from activation of the multiplex communication system to start of data transfer.

Next, an example of the process from activation of the multiplex communication system 200 to the start of data transfer will be described with reference to the flowchart of FIG. 5. First, if the mounting device 10 is powered on in step (hereinafter simply referred to as "S") 11 shown in FIG. 5, the controller 86 (see FIG. 3) supplies power or executes an initialization process, or the like on various devices. For example, the multiplexing device 3 executes the configuration of the processing circuit 221 which is an FPGA.

Next, the controller 86 determines the operation mode (S13). In the mounting device 10 of the present embodiment, in addition to the mode of executing a normal mounting work, for example, a maintenance mode is set in which maintenance can be performed with the head section 22 removed. Switching of this mode is changed, for example, according to the input to the touch panel of the display device 13 (see FIG. 1). The controller 86 displays, for example, a request for selection of a mode to the user on the display device 13, in S13.

In response to the selection of the normal mode (S13: YES), the controller 86 executes a process of establishing communication between the multiplexing devices 1 and 3 by the optical communication cable 120 (S15). For example, the multiplexing device 3 on the controller 86 side repeatedly executes the process of transmitting a signal requesting the start of communication to the multiplexing device 1 at every predetermined timing until there is a response from the processing circuit 231 of the multiplexing device 1.

Next, similarly to S15, the controller 86 executes a process of establishing communication between the multiplexing devices 1 and 5 by the electric communication cable 121 (S17). If both the communication by the optical communication cable 120 and the communication by the electric communication cable 121 are established, the controller 86 starts the transmission of data concerning the mounting work between the multiplexing devices 1, 3, and 5.

The controller 86 transmits the frame data FRMD1 to the Y-axis direction slide mechanism 52 (multiplexing device 1) (S 19). The processing circuit 221 (see FIG. 4) of the multiplexing device 3 outputs data input from various boards (such as the control board 94) of the controller 86 to the multiplexing section 223, and multiplexes it into the frame data FRMD1 by the multiplexing section 223. In the frame data FRMD1, both the data directed to the input and output device 271 connected to the multiplexing device 1 and the data directed to the input and output device 272 connected to the multiplexing device 5 are multiplexed.

Next, the processing circuit 231 of the multiplexing device 1 executes a transfer process (S21). The processing circuit 231 separates data directed to the input and output device 271, among the data input from the demultiplexing section 235, and outputs the data to the input and output device 271. Further, the processing circuit 231 outputs to the multiplexing section 234 the data directed to the multiplexing device 5 (input and output device 272) among the data input from the demultiplexing section 235. At this time, the processing circuit 231 executes such that a series of processes up to the transmission of the data received from the optical communication cable 120 to the electric communication cable 121 is processed according to a certain internal clock.

Next, the processing circuit 251 of the multiplexing device 5 receives data obtained by demultiplexing the frame data FRMD2 by the demultiplexing section 255. The processing circuit 251 executes a predetermined process on the data input from the demultiplexing section 255, and outputs the data to the input and output device 272 (S23). In this way, the data transmitted from the multiplexing device 3 is transmitted.

In addition, in a case where data is transmitted from the multiplexing device 5 to the multiplexing device 3, a process opposite to the above process is performed. Data transmission from the multiplexing device 5 to the multiplexing device 3 is, for example, a process of transmitting the image data imaged by the parts camera 47 (see FIG. 3) to the image board 91 of the controller 86. The processing circuit 251 outputs the data input from each input and output device 272 including the parts camera 47 to the multiplexing section 253, multiplexes the data by the multiplexing section 253, and transmits the multiplexed data to the electric communication cable 121.

The processing circuit 231 of the multiplexing device 1 executes a transfer process directed to the controller 86 (S25). The processing circuit 231 receives data directed from the input and output device 271 to the controller 86. The processing circuit 231 outputs the data input from the demultiplexing section 236 and the data input from the input and output device 271 to the multiplexing section 233. The multiplexing section 233 multiplexes the data input from the processing circuit 231, and transmits the data to the multiplexing device 3 through the optical communication cable 120. In this way, the mounting device 10 executes a mounting work of the electronic component on the circuit board 100 while transmitting data concerning the mounting work by the multiplex communication system 200.

Next, a case where the maintenance mode is selected in S13 will be described. As described above, the head section 22 is attached to the Y-axis slider 58 through the connector 48, is attachable and detachable, for example, with one touch, and can be changed to a different type head section 22. The head section 22 has different shapes and sizes depending on its type. Therefore, a work to check is needed whether or not there is a possibility that the changed head section 22 moves in the X-axis direction, the Y-axis direction, and the up-down direction to come into contact with another device. The user moves the Y-axis slider 58 of the Y-axis direction slide mechanism 52 to the XY coordinate position or the height position in the up-down direction, set in the control data (recipe) for performing board-mounting, for example, in a state where the head section 22 is once removed, and checks the movable range of the head section 22. Therefore, in the maintenance mode, control to move the Y-axis slider 58 is performed, with one end of the electric communication cable 121 removed from the external terminal 259 of the head section 22 (multiplexing device 5).

In the mounting device 10 of the present embodiment, in the maintenance mode, only the communication between the multiplexing devices 1 and 3 is established, and the X-axis direction slide mechanism 50 and the Y-axis direction slide mechanism 52 becomes controllable. The controller 86 executes a process of establishing communication between the multiplexing devices 1 and 3 by the optical communication cable 120 (S31), in response to the selection of the maintenance mode (S13: NO), in S13. Then, if the communication of the multiplexing devices 1 and 3 is established, the controller 86 displays a fact that the Y-axis direction slide mechanism 52 or the like is controllable on the display device 13 without executing the establishment of communication between the multiplexing devices 1 and 5 (S33). The user can perform maintenance (checking of the movable range of the head section 22, or the like) by moving the Y-axis slider 58 with the head section 22 removed, by performing an operation according to the display on the display device 13. If the user operates the touch panel of the display device 13 and inputs that the maintenance is completed, the controller 86 terminates the maintenance mode. In this way, the mounting device 10 is capable of realizing two modes.

Incidentally, the electronic component mounting device 10 is an example of the work machine. The controller 86 and the multiplexing device 3 are an example of the master device. The multiplexing device 1 is an example of the first slave device. The multiplexing device 5 is an example of the second slave device. The head section 22 is an example of the movable section. The frame data items FRMD1 and FRMD2 are examples of multiplexed data. S15 is an example of the first communication establishing process. S17 is an example of the second communication establishing process. The process of S21 is an example of the demultiplexing process and the transfer process. S25 is an example of the multiplexing transmission process.

According to the present embodiment described in detail above, the following effects are obtained.

According to effect 1 in the mounting device 10, the multiplexing device 5 of the head section 22 which is attachable to and detachable from the Y-axis slider 58 is connected to the multiplexing device 1 through the electric communication cable 121. Malfunctions such as communication failure due to adhesion of dust is less likely to occur in the electric communication cable 121, for example, a LAN cable, compared to the optical communication cable 120 through which communication by optical signals is performed. That is, the multiplexing device 5, from which the cable is likely to be removed, is connected through the electric communication cable 121 for which the communication failure due to dust or the like is relatively unlikely to occur. On the other hand, the multiplexing devices 1 and 3, from which cables are less likely to be removed, are connected through the optical communication cable 120. With such a configuration, it is possible to reduce opportunities to attach and detach the optical communication cable 120 and suppress the occurrence of communication failure due to dust or the like.

Further, the optical modules 220 and 230 for connecting the optical communication cable 120 are likely to be larger in the size than the external terminals 239 and 259 connecting the electric communication cable 121. Therefore, since the mounting device 10 includes the external terminal 259 as the network interface provided in the head section 22 which is an attachable and detachable portion, the entire size of the head section 22 can be reduced.

Further, the multiplexing device 1 performs a process of separating data directed to the input and output device 271, among frame data FRMD1 received from the multiplexing device 3, by time division multiplex communication by optical communication. Further, the processing circuit 231 of the multiplexing device 1 multiplexes only the data directed to the multiplexing device 5 from the multiplexing device 3, by using the multiplexing section 234, among the data items demultiplexed by the demultiplexing section 235, and transfers the multiplexed data to the multiplexing device 5 through the electric communication cable 121. With such a configuration, the processing circuit 231 separates necessary data among the frame data FRMD1 transmitted from the multiplexing device 1, thereby reducing the amount of data to be transferred to the multiplexing device 5. As a result, it becomes possible to make the communication cable (the electric communication cable 121) between the multiplexing devices 1 and 5 slower than the communication cable (optical communication cable 120) between the multiplexing devices 1 and 3.

According to effect 2 in the multiplexing device 1 of the present embodiment, when performing a data transfer process from the multiplexing device 3 to the multiplexing device 5, the frequency of the clock which is the reference of the internal process in the FPGA of the processing circuit 231 is adjusted to match the clock that transmits the frame data FRMD1. With such a configuration, a timing adjustment buffer or the like is unnecessary, and delay due to the buffer does not occur.

According to effect 3, if both the communication by the optical communication cable 120 and the communication by the electric communication cable 121 are established, the controller 86 starts the transmission of data concerning the mounting work from the multiplexing device 3 to the multiplexing device 5. In this way, the controller 86 independently controls communication by the optical communication cable 120 and communication by the electric communication cable 121. Further, in the maintenance mode, the mounting device 10 establishes only the communication between the multiplexing devices 1 and 3, and can control the X-axis direction slide mechanism 50 and the Y-axis direction slide mechanism 52. Thus, the multiplex communication system 200 can operate even in a state where the electric communication cable 121 is removed.

According to effect 4, the processing circuit 251 of the multiplexing device 5 multiplexes the data input from the input and output device 272 by the multiplexing section 253, and transmits the multiplexed data to the electric communication cable 121. The processing circuit 231 of the multiplexing device 1 outputs the data input from the demultiplexing section 236 and the data input from the input and output device 271 to the multiplexing section 233. The multiplexing section 233 multiplexes the data input from the processing circuit 231, and transmits the data to the multiplexing device 3 through the optical communication cable 120. Thus, the multiplexing devices 1, 3, and 5 are capable of performing communication in which only necessary data in bidirection is multiplexed.

It is to be understood that the present disclosure is not limited to the embodiment described above but various improvements and modifications can be made without departing from the spirit of the present disclosure. For example, in the embodiment, the controller 86 performs the communication establishment process (S15 and S17), but the multiplexing device 1 may function as the master device to execute the communication establishment process.

In addition, the processing circuits 221, 231, and 251 are not limited to logic circuits such as FPGAs, but may be processing circuits which are mainly configured with a CPU and which realize various functions by executing programs and the like. Similarly, the multiplexing section 223 and the demultiplexing section 225 may be logic circuits such as FPGAs, or a processing circuit which are mainly configured with a CPU.

Further, the communication method (protocol, or the like) in the optical communication cable 120 and the electric communication cable 121 is not particularly limited. For example, communication in the optical communication cable 120 may be half-duplex communication. Further, communication in the optical communication cable 120 may be multiplex communication by frequency (wavelength) division.

Further, in the embodiment, the controller 86 determines whether or not it is necessary to establish communication of the electric communication cable 121 depending on the mode selection, but the present disclosure is not limited thereto. For example, the controller 86 may be configured such that after continuing the communication establishment process (S17) by the electric communication cable 121 only for a predetermined time, in a case where the establishment is not possible, the controller 86 displays on the display device 13 that only the establishment of communication by the optical communication cable 120 is completed, and urges the user to start the maintenance work. With such a configuration, there is no need to provide two modes, simply removing the head section 22 (the multiplexing device 5) makes it impossible to establish communication of the electric communication cable 121, and the maintenance is automatically started.

In the embodiment, two slave devices are connected to one master device, but the number of master devices may be two or more, and the number of slave devices may be three or more.

In the embodiment, the electronic component mounting device 10 which mounts the electronic component on the circuit board 100 has been described, but the work machine in the present application is not limited thereto but may be applied to another board work machine such as a screen printing device. Further, the work machine may be applied to, for example, a work robot that implements an assembly work of a secondary battery (a solar cell, a fuel cell, or the like).

REFERENCE SIGNS LIST 1, 3, 5: optical multiplexing device, 10: electronic component mounting device, 22: head section, 120: optical communication cable, 121: electric communication cable, 200: multiplex communication system, FRMD1, FRMD2: frame data

The invention claimed is:
1. An electronic component mounting machine which performs a mounting work, comprising:
   a movable section which holds a workpiece; and
   a multiplex communication system which transmits data concerning the mounting work, the multiplex communication system comprising:
      a master multiplexing device;
      a first slave multiplexing device which is connected to the master multiplexing device through an optical communication cable, and performs multiplex communication with the master multiplexing device by optical communication; and
      a second slave multiplexing device which is connected to the first slave multiplexing device through an electric communication cable, the electric communication cable being configured to be attachable and detachable, and performs multiplex communication with the first slave multiplexing device by electric communication, wherein the first slave multiplexing device performs a demultiplexing process of separating data directed to the first slave multiplexing device, among multiplexed data received from the master multiplexing device, by multiplex communication by the optical communication, and a transfer process of multiplexing data directed to the second slave multiplexing device from the master multiplexing device, among data demultiplexed according to the demultiplexing process, and transferring the multiplexed data to the second slave multiplexing device by multiplex communication by the electric communication, and wherein the movable section includes the second slave multiplexing device, and is configured to be attachable to and detachable from a device main body of the electronic component mounting machine.

2. The electronic component mounting machine according to claim 1, wherein in the multiplex communication by the optical communication, a frequency of a clock synchronizing a timing of transmitting the multiplexed data and a frequency of a clock which is a reference of the data transfer process from the master multiplexing device to the second slave multiplexing device in the first slave multiplexing device are the same as each other.

3. The electronic component mounting machine according to claim 1, wherein the first slave multiplexing device performs a first communication establishing process of establishing communication with the master multiplexing device, and a second communication establishing process of starting a data transfer process from the master multiplexing device to the second slave multiplexing device, in response to determining that communication with the second slave multiplexing device is established, in addition to establishing communication by the first communication establishing process.

4. The electronic component mounting machine according to claim 1, wherein the first slave multiplexing device performs a multiplexing transmission process of multiplexing data received from the second slave multiplexing device to be transmitted to the master multiplexing device and data to be transmitted from the first slave multiplexing device to the master multiplexing device, and transmitting the multiplexed data to the master multiplexing device through the optical communication cable.

5. The electronic component mounting machine according to claim 1, wherein the master multiplexing device is provided in a base of the electronic component mounting machine.

* * * * *